Feb. 11, 1958 W. C. CAMPBELL 2,822,882
MAXIMUM SPEED CONTROL MECHANISM FOR MOTOR VEHICLES OR OTHER EQUIPMENT
Filed May 18, 1955
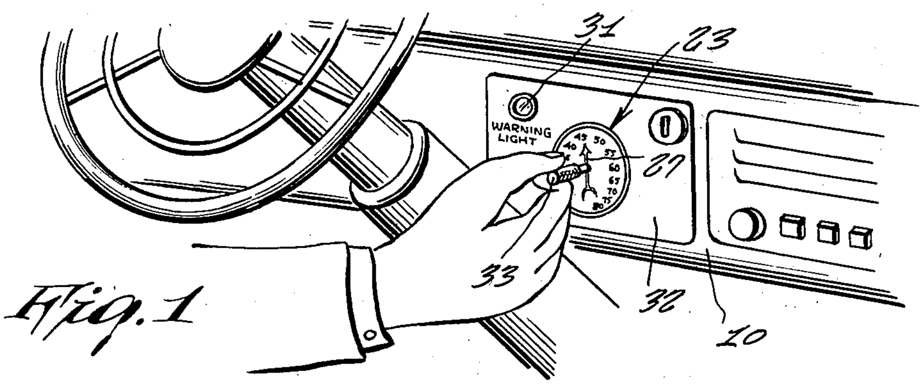
Fig. 1
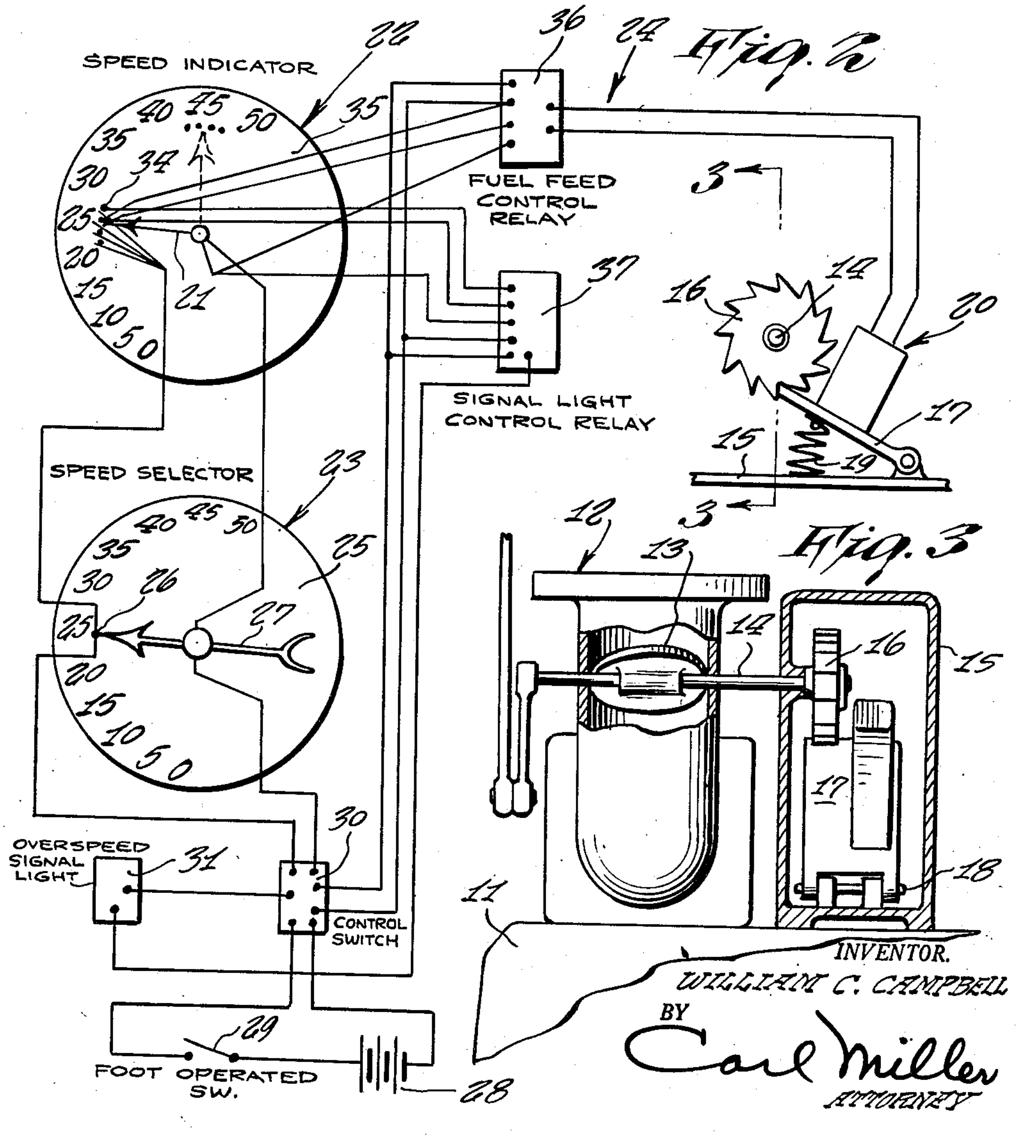
Fig. 2
Fig. 3
INVENTOR.
WILLIAM C. CAMPBELL
BY Carl Miller
ATTORNEY United States Patent Office 2,822,882

Patented Feb. 11, 1958

2,822,882

MAXIMUM SPEED CONTROL MECHANISM FOR MOTOR VEHICLES OR OTHER EQUIPMENT

William C. Campbell, Chatham, N. J.

Application May 18, 1955, Serial No. 509,262

1 Claim. (Cl. 180—82.1)

This invention relates to maximum speed control mechanisms for motor vehicles or other equipment.

It is an object of the present invention to provide an electrically controlled and operated mechanical system which will permit the operator of the motor vehicle or other equipment to select the maximum speed to be attained by the vehicle and which will assist the operator to control the speed of the vehicle or other equipment at the maximum speed selected and which will notify the operator by a visible signal if for any reason the selected maximum speed is exceeded.

It is another object of the present invention to provide a speed control system of the above type which is directly controlled by the attained speed of the vehicle as indicated by the speed indicating device and not directly by the speed of the engine and wherein the desired maximum speed may be changed at any time whether or not the vehicle or the vehicle engine is in operation and the vehicle made to respond.

Other objects of the present invention are to provide a maximum speed control mechanism for motor vehicles or other equipment, bearing the above objects in mind, which is of simple construction, has a minimum number of parts, is inexpensive to manufacture and efficient in operation.

For other objects and for a better understanding of the invention reference may be had to the following detailed description taken in connection with the accompanying drawing, in which:

Figure 1 is a perspective view of a dash board showing the invention in operative use thereon;

Fig. 2 is a circuit diagram of the invention.

Fig. 3 is a vertical sectional view taken along the line 3—3 of Fig. 2.

Referring now more in detail to the drawing, 10 indicates the dash board of the vehicle, 11 the engine block, and 12 indicates generally the carburetor mounted thereon and including the butterfly valve 13, all in a manner well known to those skilled in the art.

In the practice of my invention, the butterfly valve 13 is provided with an elongated shaft extension 14 which is journalled in a casing 15, the ratchet wheel 16 being keyed onto the shaft 14 within the casing 15. A pawl 17 is pivotally mounted at its lower end within the casing 15 by means of the pin 18 and is adapted to engage the ratchet wheel 16 whereby to prevent the rotational movement thereof in the valve opening position, the pawl 17 being retained in a horizontal and operative position by means of the coil spring 19. However, the pawl 17 is drawn into an operative position (Fig. 2) by means of a solenoid mechanism indicated generally at 20. Thus, upon energization of the solenoid mechanism 20, the pawl 17 will be moved into the operative position of Fig. 2 to prevent the further opening movement of the butterfly valve 13 of the carburetor by engagement with the ratchet wheel 16, as will be obvious.

The maximum speed control system of the present invention is based upon, activated and controlled by the rate of speed attained by the vehicle as indicated by the position of the indicating needle 21 of the vehicle speed indicating device indicated generally at 22. When a desired maximum speed is attained by the vehicle, an electrical circuit between a maximum speed selector indicated generally at 23 and a fuel feed control device indicated generally at 24 is closed to energize the solenoid 20 and a control of the operation of the vehicle engine, carburetor, butterfly valve 13 is thus established to limit an increase in the rate of fuel feed to the engine through the carburetor 12, thus limiting a further increase in the speed of the vehicle caused by an increase in the speed of the engine.

The maximum speed selector device 23 includes a dial 25 marked similarly to the speed indicator device 22 to show miles per hour with separate electrical contact points 26 at intervals (for example, at 25 miles per hour) and a movable indicating needle 27 which is connected to and provides a portion of an electrical circuit. The needle 27 can be rotated to contact various electrical contact points placed on the face of the dial so that separate circuits will be formed at each contact point (25, 30, 35, 40 . . . 60 miles per hour, etc.). A push button device with similar instruments may be used, if desired; this component of the system also provides electrical connection to the vehicle electrical power supply 28 and controls the flow of electrical power to the speed control system through the switches 29 and 30. There is also provided a signal light 31 on this component and connected to the system which will light to warn the operator if a selected maximum speed is exceeded. As shown in Fig. 1, the speed selector 23 and signal light 31 are mounted on the panel 32 on the dash board 10, the position of the needle 27 being adjusted by the knurled external handle 33.

The vehicle speed indicating device 22 is a governor-type speedometer calibrated to indicate the speed of the vehicle in miles per hour and balanced to compensate for the dampening effect caused by the indicating needle 21 brushing the points 34 placed on the indicating dial 35. The speed indicating needle 21 is connected to and made a part of an electrical circuit. The dial has two sets of electrical contact points 34 placed at intervals on the dial face (for instance, at a location that, when reached by the indicating needle, indicates that a speed of 25 miles per hour has been attained by the vehicle). A contact point touched by the indicating needle 21 will complete a portion of the individual electrical circuit connected to one of the individual electrical circuits from a speed selector device 23 (for instance, the 25 mile per hour circuit, as shown in Fig. 2). The thus formed circuit between the 25 mile per hour point on the speed selector 23 and the 25 mile per hour point on the speed indicating device 22 and energized, controls the operation of the electrical relay (break-make type 36) that shuts off and turns on the power supply to operate the engine fuel feed control mechanism 24.

The speedometer normally installed in a motor vehicle may be modified by the addition of contact points 34 and electrical wiring therein, and balanced to compensate for the dampening effect caused by the indicating needle 21 lightly touching the contact points 34 on the dial face 35. If desired, a photo-electric tube mechanism may be placed on the speedometer, so that when the speed indicating needle passes the tube, the fuel feed control mechanism will be activated and function.

It will be noted that the pawl 17, when engaging the ratchet wheel 16, will prevent the motion of the butterfly wheel 13 in the valve opening position, but does not prevent movement of the valve in the valve closing position. This control on the operation of the carburetor butterfly valve 13 when applied, prevents an increase in the rate of fuel feed to the carburetor. The movement of the pawl 17 is controlled by the solenoid 20 that is energized by the vehicle electrical power supply 28 through the relay 36 that is turned off and on by the electrical power supplied through the electrical circuit described above and made through the speed selector 23 and speed indicating device 22.

The exceeded speed warning light 31 located on the speed selector device 23 is powered from the vehicle electrical power supply 28 and is controlled by another relay (break-make type) 37 activated similarly by electrical circuits as described above and contained in the speed selector and speed indicating devices. Contact points, in addition to those controlling the relay which controls the fuel feed device 24, are placed on the speed indicating device dial 35 at various points (for instance at the location which, when touched by the speedometer indicating needle 21, indicates that a speed of 27 miles per hour is attained) so that the relay 37 will operate to turn on and off the power supply to the signal light 31 which will indicate that a desired maximum speed of 25 miles per hour has been exceeded.

It should be noted that the system is foolproof and that if a component or any portion of the system malfunctions, or if the power supply is interrupted, the normal operation of the vehicle is not affected. Unless the speed control system is in operation and unless the selected maximum speed of the vehicle is attained, the normal operation of the carburetor or the engine or the vehicle is in no way affected, thus permitting full flexibility of operation and accommodating changing power demands such as required on upgrades, etc. The control system, it will be apparent, can be turned on and off as desired by the operator at any time. An emergency control switch 30 is provided which, if necessary, will discontinue the power supplied to the system and immediately de-activate the entire system and thus de-activate any control of the vehicle operation. The system thus notifies the operator that the selected maximum speed has been exceeded.

While various changes may be made in the detail construction, it shall be understood that such changes shall be within the spirit and scope of the present invention as defined by the appended claim.

Having thus set forth and disclosed the nature of my invention, what is claimed is:

A maximum speed control mechanism for motor vehicles having a butterfly valve operated carburetor comprising, in combination, an extension on each end of the butterfly valve shaft of the carburetor, a foot pedal operatively connected to one of said extensions for actuating said butterfly valve shaft, a housing adjacent to and rotatably supporting the other said extension, a ratchet wheel keyed to said other extension, a pawl pivotally supported within said housing directly beneath said ratchet wheel and in operative engagement therewith to limit said actuation of said butterfly valve shaft, spring means acting between said housing and said pawl normally urging said pawl out of engagement with said ratchet wheel, solenoid means disposed within said housing between said pawl and a side wall thereof for drawing said pawl to the operative position against the action of said spring means whereby to limit the valve open position of the carburetor, control means for automatically energizing said solenoid means in response to movement of said vehicle beyond a predetermined speed, and adjustment means for regulating said predetermined speed setting.

References Cited in the file of this patent

UNITED STATES PATENTS

| | | |
|---|---|---|
| 1,290,443 | Wessoleck | Jan. 7, 1919 |
| 2,100,214 | Graham | Nov. 23, 1937 |
| 2,159,405 | Schubert | May 23, 1939 |
| 2,169,268 | McCullough | Aug. 15, 1939 |
| 2,171,401 | McCoy | Aug. 29, 1939 |
| 2,174,062 | Raesler | Sept. 26, 1939 |
| 2,351,245 | Walker | June 13, 1944 |
| 2,718,283 | Ropp | Sept. 20, 1955 |